(12) United States Patent
Staub et al.

(10) Patent No.: US 10,896,365 B2
(45) Date of Patent: Jan. 19, 2021

(54) MULTI-LAYERED BODY, AND SECURITY DOCUMENT

(71) Applicant: OVD Kinegram AG, Zug (CH)

(72) Inventors: Rene Staub, Hagendorn (CH); Sascha Mario Epp, Steinhausen (CH); Orvy Emanuel Toberer, Buttwil (CH); John Anthony Peters, Au-Zurich (CH)

(73) Assignee: OVD KINEGRAM AG, Zug (CH)

( * ) Notice: Subject to any disclaimer, the term of this patent is extended or adjusted under 35 U.S.C. 154(b) by 39 days.

(21) Appl. No.: 15/552,444

(22) PCT Filed: Feb. 25, 2016

(86) PCT No.: PCT/EP2016/054028
§ 371 (c)(1),
(2) Date: Aug. 21, 2017

(87) PCT Pub. No.: WO2016/135265
PCT Pub. Date: Sep. 1, 2016

(65) Prior Publication Data
US 2018/0039877 A1 Feb. 8, 2018

(30) Foreign Application Priority Data
Feb. 25, 2015 (DE) .................. 10 2015 102 731

(51) Int. Cl.
*G06K 19/00* (2006.01)
*G06K 19/077* (2006.01)
(Continued)

(52) U.S. Cl.
CPC ... *G06K 19/07773* (2013.01); *G06K 7/10544* (2013.01); *G06K 19/06009* (2013.01); *G06K 19/06028* (2013.01); *G06K 19/07749* (2013.01); *G07D 7/01* (2017.05); *H01Q 1/00* (2013.01); *H01Q 1/38* (2013.01); *H01Q 5/00* (2013.01); *H01Q 7/00* (2013.01)

(58) Field of Classification Search
CPC ......... G06K 19/07773; G06K 7/10544; G06K 19/06009; G06K 19/07749; G07D 7/01; H01Q 1/00; H01Q 1/38; H01Q 5/00; H01Q 7/00
USPC ......................... 235/435, 439, 454, 487, 492
See application file for complete search history.

(56) References Cited

U.S. PATENT DOCUMENTS 6,848,618 B1 2/2005 Krul
8,308,197 B2 11/2012 Peters et al.
(Continued)

FOREIGN PATENT DOCUMENTS

DE 10150194 4/2003
DE 102004031879 1/2006
(Continued)

OTHER PUBLICATIONS

International Standard ISO/IEC 14443-1, 2008.

*Primary Examiner* — Matthew Mikels
(74) *Attorney, Agent, or Firm* — Hoffmann & Baron, LLP

(57) ABSTRACT

A multilayer body with a functional layer which includes an antenna element as well as with an optical security element which includes at least one electrically conductive partial region which is galvanically connected to the antenna element. A security document with such a multilayer body, as well as a method for the authentication thereof.

32 Claims, 12 Drawing Sheets

(51) Int. Cl.
*G06K 7/10* (2006.01)
*G06K 19/06* (2006.01)
*H01Q 1/00* (2006.01)
*H01Q 5/00* (2015.01)
*H01Q 1/38* (2006.01)
*H01Q 7/00* (2006.01)
*G07D 7/01* (2016.01)

(56) References Cited

U.S. PATENT DOCUMENTS

| | | | |
|---|---|---|---|
| 8,441,403 B2 | 5/2013 | Peters et al. | |
| 8,702,005 B2 | 4/2014 | Peters et al. | |
| 2006/0164249 A1 | 7/2006 | Lutz et al. | |
| 2006/0186204 A1 | 8/2006 | Lubow | |
| 2006/0232413 A1* | 10/2006 | Lam | G06K 19/06018 340/572.1 |
| 2007/0057054 A1 | 3/2007 | Maranov | |
| 2007/0229263 A1 | 10/2007 | Staub et al. | |
| 2008/0314988 A1* | 12/2008 | Geuens | B32B 37/185 235/488 |
| 2009/0145971 A1* | 6/2009 | Yin | G06K 19/0716 235/492 |
| 2010/0172000 A1* | 7/2010 | Holmes | G03H 1/028 359/2 |
| 2012/0038463 A1* | 2/2012 | Kaminska | B42D 25/29 340/10.1 |
| 2013/0244583 A1* | 9/2013 | Dhayni | G01R 29/10 455/67.14 |
| 2015/0170019 A1 | 6/2015 | Beenken | |
| 2015/0278673 A1* | 10/2015 | Zenz | G06K 19/07754 235/492 |

FOREIGN PATENT DOCUMENTS

| | | |
|---|---|---|
| DE | 102004059798 | 6/2006 |
| DE | 102005048033 | 4/2007 |
| DE | 102006043021 | 3/2008 |
| DE | 102007023860 | 11/2008 |
| DE | 102007044992 | 12/2008 |
| DE | 102009023715 | 12/2010 |
| DE | 102009053978 | 6/2011 |
| DE | 102012106594 | 1/2014 |
| FR | 2840430 | 12/2003 |
| JP | 200367697 | 3/2003 |
| JP | 2006107296 | 4/2006 |
| JP | 2006-528380 | 12/2006 |
| WO | WO02095674 | 11/2002 |
| WO | 2011003829 A1 | 1/2011 |

\* cited by examiner

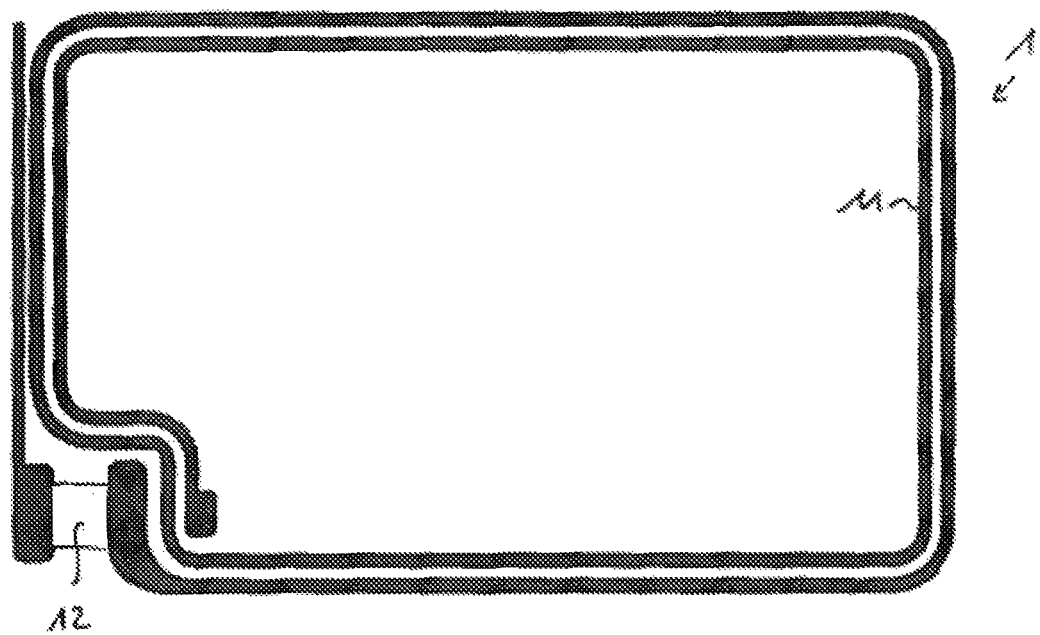
Fig. 10 (State of the art)
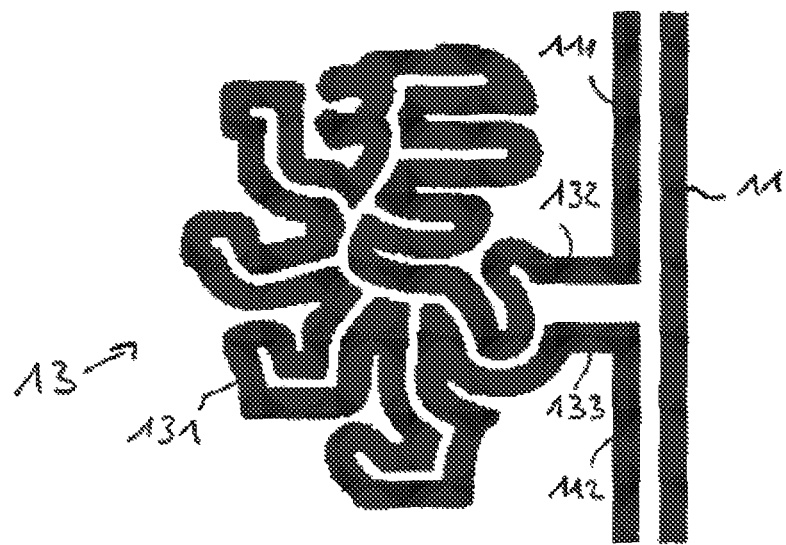
Fig. 11

MULTI-LAYERED BODY, AND SECURITY DOCUMENT

This application claims priority based on an International Application filed under the Patent Cooperation Treaty, PCT/EP2016/054028, filed Feb. 25, 2016, which claims priority to DE102015102731.3, filed Feb. 25, 2015.

BACKGROUND OF THE INVENTION

The invention relates to a multilayer body with a functional layer as well as a security document with such a multilayer body and a method for authenticating such a multilayer body.

In order to provide security documents with additional functions, electronic functional layers can be integrated into such documents. As a rule, these comprise integrated circuits for storing and transferring information, which can be contacted wirelessly for example via an antenna structure integrated into the functional layer.

In this way, for example personalization information for identity documents, product or price information for product labels or similar data allocated to the respective document can be electronically stored and read.

Such functional layers are usually completely enclosed between non-transparent covering layers, with the result that they are not visible from outside and do not interfere with the overall design of the respective security document. However, this has the consequence that any manipulations of the functional layer cannot be recognized visually.

Furthermore, electronic functional layers and also antenna structures are known which, taken as a whole, form a graphic design and accordingly are not enclosed by covering layers, but remain visible. Such antenna structures make manipulations of the functional layer difficult.

However, this is associated with the disadvantage that such proprietary antenna structures are not generally standard-compliant in terms of their electrical properties and their geometry. Correspondingly standardized readers which are widespread because of standardization cannot therefore be used for communication with such a proprietary functional layer, which greatly limits practical applicability.

SUMMARY OF THE INVENTION

The object of the present invention is therefore to provide a multilayer body with a functional layer as well as a security document with such a multilayer body, which have improved protection against forgery and manipulation. It is a further object of the invention to provide a method for authenticating such a multilayer body.

This object is achieved by a multilayer body according to claim 1, a method according to claim 35, a security document according to claim 40 and by a method according to claim 42.

Such a multilayer body has a functional layer which comprises an antenna element. Furthermore, the multilayer body has an optical security element which comprises at least one electrically conductive partial region which is galvanically connected to the antenna element.

Such a multilayer body can, taken as a whole, already form a security document or also be integrated into a security document. For the latter, the multilayer body can for example be provided as a transfer or laminating film and be transferred onto the respective document or be combined with further layers by gluing or laminating to produce a security document.

By a "security document" is meant for example an identity document, identification document, visa document, certificate, credit card, debit card, product label or the like.

In a method for authenticating such a multilayer body, at least one electrical property of a conductive partial region of the multilayer body is measured wirelessly and compared with a target value.

A method for producing such a multilayer body comprises the steps of:
  providing a substrate with an antenna element;
  applying a security element with at least one electrically conductive partial region to the substrate, wherein the electrically conductive partial region is galvanically connected to the antenna element.

It is possible that the security element is provided on a transfer film and is transferred onto the substrate by hot stamping, cold stamping or laminating. Alternatively, the security element can however also be directly applied to the substrate and/or the antenna element.

It is possible here that the electrically conductive partial region and/or the antenna structure is produced by applying a seed layer of a first metal and galvanizing and/or metalizing with a further metal. The seed layer can for example be applied by printing. In this way it is possible to form any structures that are both decorative and have the desired functional properties.

It is further preferred if the electrically conductive partial region and the antenna structure are galvanically connected by means of a conductive varnish and/or by means of a through-connection. It is thus also possible to realize complex multilayer structures.

The presence of a security element galvanically connected to the antenna element provides an additional security feature. In the case of manipulations of the functional layer, the security element also has to be manipulated or completely replaced. Such manipulation attempts can therefore already be optically recognizable on the security element.

At the same time the galvanic connection between antenna element and security element leads to a change in the electrical properties of the antenna element. In particular, the resonance frequency, the inductance, the capacitance and/or the resistance and thus the bandwidth of the antenna element can be influenced. This can also facilitate the recognition of manipulations or forgeries of the functional layer, as for example a correspondingly manipulated functional layer no longer has the desired electrical properties which are necessary for communication with a reader. Furthermore, the separately measurable electrical properties of the multilayer body can represent an authentication feature of its own, with the result that a security document with such a multilayer body obtains additional security features that can in particular be checked electrically or electronically.

As the main antenna function is however still allocated to the antenna element, the latter can be designed substantially standard-compliant, with the result that likewise standard-compliant readers can be used and such a multilayer body can also be used in standardized applications.

In order to ensure standard-compliance, there are basically two possibilities. On the one hand the security element can be designed such that the electrical properties of the antenna element are still influenced as little as possible. Thus the antenna element can then correspond to the standard both in terms of its electrical properties and in terms of its geometry.

On the other hand, the antenna element can be designed such that it does not, by itself, correspond to the desired standard in terms of its electrical properties. Only when the electrical properties are changed by galvanic connection to the security element is standard-compliance restored. This offers additional security, as a manipulated, bypassed or incorrectly forged security element connected to the antenna element would be incapable of communication with a standard-compliant reader.

In a preferred embodiment, the electrically conductive partial region of the security element galvanically connects a first partial region of the antenna element to a second partial region of the antenna element.

If, during a manipulation attempt, the security element is damaged or its connection to the antenna element is interrupted, the connection between the partial regions of the antenna element is lost here. Thus its electrical properties are significantly changed, with the result that either communication with a reader is no longer possible or the manipulation can easily be recognized by the reader.

It is further preferred if the antenna element comprises at least one winding.

It is expedient if the at least one winding is arranged in a frame-shaped region of the multilayer body with the external dimensions 81 mm×49 mm and the internal dimensions 64 mm×34 mm.

By "a frame-shaped region" is meant that the region is limited towards the outside by a rectangle with the external dimensions indicated and towards the inside by a rectangle with the internal dimensions indicated, wherein the sides of the two rectangles run parallel in pairs and equidistant from each other.

Such a geometry of the antenna element is compliant with standard ISO/IEC 14443-1, which establishes the antenna geometry for electronically readable identification documents and passports.

It is further preferred if the security element is arranged within the region enclosed by the at least one winding.

Such an arrangement is in particular advantageous in order to minimize the influence of the security element on the electrical properties of the antenna element. The precise arrangement of the security element within the enclosed region is arbitrary.

It is further preferred if the electrically conductive partial region of the security element covers a maximum proportion of 20%, preferably from 10% to 15%, of the area enclosed by an outermost winding of the antenna element.

By such a limiting of the area covered by the security element relative to the area enclosed by the primary antenna, the influence of the electrically conductive partial region of the security element on the electrical properties of the antenna element can be further limited.

In a further preferred embodiment, the electrically conductive partial region of the security element is formed as a track structure with a width of more than 100 µm, preferably from 500 µm to 2000 µm.

Track structures with such dimensions are broad enough to be able to serve in particular as a reflective layer for further optical security features and to be able to make a sufficiently large reflective area available.

The windings of the antenna element are spaced at least 100 µm, preferably between 400 µm and 800 µm apart from each other, in order to achieve sufficient adhesion of the layer bearing the antenna element to further layers arranged above the antenna element. These layers are in particular thermoplastic, with the result that, for example, during a lamination process a sufficient connection of the layers can be achieved by fusing and/or gluing in the spaces between the windings of the antenna element.

It is further expedient if the electrically conductive partial region of the security element is formed as a track structure with a layer thickness of from 20 nm to 50 µm, preferably from 5 µm to 20 µm.

The diameter of the electrically conductive partial region is preferably less than 30 mm, particularly preferably between 15 mm and 25 mm.

The electrically conductive partial region of the security element is preferably formed from a reflective material, in particular aluminum, copper, silver, gold, or a metal alloy thereof. The electrically conductive partial region can also consist of a sequence of different conductive materials, for example a layer construction consisting of a base layer of silver and copper deposited thereon.

Such materials combine a good electrical conductivity with an attractive optical appearance. The materials are suited to further processing and can for example be applied by metalization, sputtering, vacuum deposition or the like in the desired geometry with high resolution and accuracy. Furthermore, it is possible to apply a first conductive base layer in a pattern corresponding to the desired shape for the electrically conductive partial region and then to reinforce it galvanically. Printing processes can also be used for applying the first conductive base layer. Alternatively to printing, the first conductive base layer can be vapor-deposited and structured in a pattern by means of known methods, for example an etching process.

Alternatively or additionally, the electrically conductive partial region of the security element can be structured by means of the action of a laser, in particular by means of laser ablation of the conductive layer. Either larger surface areas can be removed with the laser and/or microscopically fine laser perforations can be introduced into the conductive layer (before and/or after structuring by means of other methods), which perforations cannot in particular be perceived with the naked human eye and can only be detected with an aid.

It is further advantageous if the antenna structure is galvanically connected to an integrated circuit.

The integrated circuit provides the necessary components for communication with an external reader and further serves for storing information allocated to the multilayer body. This can for example be personalization information for an identification document or a credit card, or also product information for a product or packaging label. Electronic security information, such as for example codes or electronic signatures can thus also be stored.

It is expedient if the antenna structure in the state connected to the circuit has an optimum resonance frequency between 14.5 MHz and 17.5 MHz, wherein this resonance frequency is dependent on the properties of the integrated circuit, among other things.

This ensures problem-free communication with conventional readers.

It is further preferred if the resonance frequency of the antenna structure in the state connected to the circuit and the electrically conductive partial region of the security element differs by not more than 5%, preferably by not more than 3% from the optimum resonance frequency of an otherwise geometrically identical antenna structure, which is not connected to the electrically conductive partial region of the security element.

By "an otherwise geometrically identical antenna structure" is meant an antenna structure which has no galvanic connection to the security element, but is otherwise congruent with the antenna structure connected to the security element.

In the event that the electrically conductive partial region of the security element connects two partial regions of the antenna structure, instead of the security element a straight connection of the partial regions is to be provided by a track which otherwise has the same width and layer thickness as the rest of the antenna structure.

In this embodiment the influence of the security element on the electrical properties of the antenna structure is thus minimized. In other words, a substantially standard-compliant antenna structure can be galvanically connected to the security element, without the communication ability thereof suffering.

Alternatively it is also possible that the resonance frequency of the antenna structure in the state connected to the circuit and not connected to the electrically conductive partial region of the security element differs by from 5% to 20%, preferably by from 15% to 20% from a target resonance frequency, at which the antenna structure can be wirelessly contacted by means of an allocated reader.

In this embodiment example, the antenna structure is thus itself out of tune vis-à-vis the reading frequency of the reader. Only by the connection to the electrically conductive partial region of the security element are the properties of the antenna structure changed such that wireless communication with the reader is made possible.

If, during a manipulation attempt, the security element is entirely or partially removed or even bypassed, communication with the reader fails, with the result that such manipulations can be easily recognized.

The antenna structure preferably has an inductance of from 1.0 µH to 6 µH, preferably from 1.5 µH to 4 µH.

It is further advantageous if the antenna structure has a capacitance of from 1 pF to 55 pF, preferably from 5 pF to 30 pF.

The electrical properties are selected such that problem-free communication with an external reader becomes possible.

It is expedient if the antenna structure has an electrical resistance of from 0.5Ω to 6Ω, preferably from 1Ω to 2.5Ω.

In the case of the antenna structures customarily used, the bandwidth of the antennae is resistance-dependent. In the resistance range indicated, the desired bandwidth of from 500 kHz to 1600 kHz, preferably 800 kHz to 1000 kHz can be achieved.

It is further advantageous if the security element has an electrical resistance of from 0.2Ω to 3Ω, preferably from 1Ω to 2Ω. The bandwidth of the antenna structure in the state connected to the security element can hereby be further advantageously influenced.

Furthermore, the security element preferably has an inductance of from 0.05 µH to 1.0 µH, particularly preferably from 0.1 µH to 0.5 µH.

It is also expedient if the security element has a capacitance of from 0.5 pF to 20 pF, preferably from 1 pF to 10 pF.

These electrical properties can be read in the context of the method described at the start and used for authenticating the security element. In the case of manipulations or inaccurate forgeries of the security element, these electrical properties differ from the respective target values, with the result that a manipulation can be recognized.

Overall, the at least one electrical property used for authenticating the multilayer body in the context of the method described at the start can be a capacitance, an inductance, a quality factor and/or a resonance frequency.

For measuring the at least one electrical property, an antenna coil of a reading device is preferably brought to cover the electrically conductive partial region. It can thus be ensured that the electrical properties of the electrically conductive partial region can be measured independently of those of the antenna structure.

It is in particular expedient if, during the measurement, the antenna coil of the reading device covers the electrically conductive partial region viewed in the direction of its surface normal by 50% to 100%.

In a further embodiment, the security element comprises an induction structure which is inductively coupled to a further induction structure of the functional layer.

Via such an induction structure, electrical energy from the reading device can be coupled into the security element and thus into the functional layer, in order to provide active components of the integrated circuit with electrical energy.

Preferably, the security element forms a design that is visible to the human eye and/or machine-readable, a coding, an image, a motif, a logo, one or more alphanumeric characters or the like. On the one hand an optically attractive design can be realized hereby, and on the other hand a further security feature can be provided. Manipulations or forgeries of the functional layer can then be recognized visually or by machine, for example by means of optical differences in the security feature.

It is further preferred if the security element is formed multilayered, wherein the electrically conductive partial region is formed by a functional layer of the security element.

Such a multilayer construction can also be realized during the manufacture of the multilayer body. It is however also possible to provide the security element separately, for example as a foil element which is then connected to the multilayer body by laminating, hot stamping, gluing or the like, wherein the galvanic connection between the electrically conductive partial region of the security element and the antenna structure of the multilayer body is produced. By means of such a multilayer construction, further security features can be integrated into the security element, further increasing protection against forgery and manipulation.

It is further expedient if the security element comprises an optically variable structure. Such structures on the one hand produce attractive optical effects which can be dependent on the illumination or viewing angle. On the other hand, optically variable structures are particularly difficult to imitate and therefore offer particularly good protection against forgery and manipulation.

It is possible that the optically variable structure is formed by a surface relief of the electrically conductive partial region. In this embodiment, the relief structures which produce the optically variable effect are thus introduced directly into the electrically conductive partial region. This can, for example, be carried out by stamping into a metal layer which forms this partial region. Any manipulation of the electrically conductive partial region in this case directly destroys the surface relief, with the result that the optically variable effect is lost or visually recognizably changed. Manipulations or forgeries can therefore already be recognized with the naked eye.

Alternatively, the optically variable structure can be formed by a surface relief of a replication layer of the security element.

This is expedient if the security element itself is constructed multilayered. Particularly good protection against manipulation and forgery is also guaranteed hereby, as for manipulations of the electrically conductive partial region, the further layers of the security element with the optically variable structure have to be removed first. This is however scarcely possible non-destructively, with the result that here too, manipulations are visually recognizable.

Here too, the security element can optionally comprise further special partial detachment and adhesive layers which ensure that in the case of an attempt to detach the replication layer from the electrically conductive partial region, this layer is destroyed.

The electrically conductive partial region can serve as reflective layer for the optically variable structure. Alternatively or additionally, further metallic or HRI layers (HRI: high refractive index) can also still be integrated into the layer construction of the security element as reflective layers for the optically variable structure. These further reflective layers can be present over the whole surface or only part thereof.

Furthermore, the surface relief can be molded into a replication layer of a separate multilayer body, for example into a hot or cold stamping film or a self-adhesive label and provided with a reflective layer. In a transfer step, the separate multilayer body with the optically variable structure is then applied, at least in a partial region, to the electrically conductive partial region of the security element, for example by means of an adhesive layer and a corresponding transfer method.

In a further preferred embodiment the surface relief forms an optically variable element, in particular a hologram, Kinegram® or Trustseal®, a preferably linear or crossed sinusoidal diffraction grating, a linear or crossed single- or multi-step rectangular grating, a zero-order diffraction structure, an asymmetrical relief structure, a blazed grating, a preferably isotropic or anisotropic mat structure, or a light-diffracting and/or light-refracting and/or light-focusing micro- or nanostructure, a binary or continuous Fresnel lens, a binary or continuous Fresnel freeform surface, a micro-prism structure or a combination structure thereof. By means of such structures, various optical effects can be realized, which are both optically attractive and difficult to imitate.

Alternatively or additionally to the surface relief, the optically variable structure can be formed by a single- or multilayer volume hologram and/or by a thin-layer film system producing a color change effect in the case of a change in the illumination and/or viewing angle, in particular a Fabry-Perot thin-layer film system.

It is further advantageous if the security element comprises at least one partial varnish layer which forms an item of optical Information.

An additional security feature can also be provided hereby, which would be damaged during manipulations of the conductive partial region. The item of optical information can stand alone or also form an overall design in combination with a design formed by the conductive partial region and/or an optionally present optically variable structure.

It is expedient if the at least one partial varnish layer comprises colorants, in particular colored or achromatic pigments and/or dyes, and/or effect pigments, thin-layer film systems, cholesteric liquid crystals, and/or metallic or non-metallic nanoparticles. Complex visual designs can hereby be realized, which also increase protection against forgery.

It is expedient if the colorants can be at least partially excited to fluorescence and/or phosphorescence in the ultraviolet and/or infrared spectrum, in particular in the visible spectrum. Thus further security features can be integrated into the security element, which only become visible under suitable illumination conditions and can then be verified visually or by machine.

It is preferred if the item of optical information is in the form of at least one motif, pattern, in particular a guilloche pattern, symbol, image, logo, coding or alphanumeric characters, in particular a microtext.

In a further preferred embodiment, the security element overlaps a further graphic element of the multilayer body, in particular an item of individualization information, at least in regions. The security element hereby receives an additional function. In the case of such an arrangement, the further graphic element can also be protected against manipulation or forgery by the security element, as access to the further graphic element is only possible by destroying the security element.

The further graphic element can for example be a photograph of a document holder, lettering with their personal data, a bar code, an item of printed product information or the like.

It is further expedient if the multilayer body comprises a covering layer which has at least one transparent partial region and at least one non-transparent partial region. In other words, the covering layer comprises at least one transparent window. Such a covering layer which is transparent in a partial region, but otherwise opaque or non-transparent, can be used to conceal partial regions of the functional layer which are not intended to be visible as they would for example interfere with the overall design, while partial regions of the functional layer which contribute to the design are visible through the window.

It is also possible to provide several covering layers which are arranged on both sides of the functional layer, with the result that design elements of the functional layer are visible from both sides of the multilayer body.

By "a transparent partial region" is meant a partial region with a transmissivity of more than 50% in the spectral range visible to the human eye. This value can be exceeded at least in a partial region of the spectral range visible to the human eye, however not necessarily throughout the entire spectral range. In particular, these window regions can also be colored, such that they are transparent only in certain parts of the visible spectral range corresponding to the coloration.

A non-transparent partial region on the other hand has a transmissivity of less than 10%, preferably of less than 5% in the spectral range visible to the human eye.

If optically active colorants are provided in the security element, which colorants can be excited by illumination with a wavelength outside the spectral range visible to the human eye, a transparent partial region preferably also has a transmissivity of at least 10%, preferably at least 25% for the respective excitation wavelengths.

Preferably, the at least one transparent partial region overlaps the security element viewed in the direction of the surface normals onto the plane spanned by the multilayer body.

It is hereby ensured that at least partial regions of the security element or visual designs thereof remain visible, with the result that, as described at the start, manipulation or forgery attempts are recognizable.

It is further preferred if the at least one non-transparent partial region at least partially overlaps the antenna structure viewed in the direction of the surface normals onto the plane spanned by the multilayer body.

Thus optically unattractive partial regions of the functional layer, in particular the antenna structure or also the integrated circuit, can be concealed, with the result that they do not interfere with the overall design of the multilayer body.

It is further expedient if, for authentication of the multilayer body, at least one individual image of the multilayer body is captured with a hand-held device and authenticated by means of an image recognition process.

Such a hand-held device can for example be a smartphone, a tablet, a PDA or the like. In addition to the electrical properties of the antenna structure, the optical properties of the security element can thus be checked at the same time.

Furthermore, it is preferred if, before and/or during the capture of the at least one individual image, instructions are displayed to a user of the hand-held device on a display of the hand-held device, in what relative position and/or at what distance from the multilayer body the hand-held device is to be held and/or moved during the capture of the image sequence.

A recognition of optically variable elements of the security element can in particular be hereby facilitated.

Furthermore, it is preferred if a target state of the multilayer body at at least one viewing angle is indicated to the user on the display of the hand-held device.

This makes possible an additional visual monitoring of the security element of the multilayer body, wherein the user is given precise guidance as to how the optical features of the security element are to be assessed and distinguished from forgeries. For example, it can thus be demonstrated to the user, what changes in motif or color effects are to occur during tilting of an optically variable security element. In addition, features of known forgeries can also for example be indicated to the user, with the result that these can also be reliably recognized.

It is further expedient if the image recognition is carried out by means of a software program executed on a computation device different from the hand-held device, to which computation device the at least one individual image is conveyed via a telecommunication connection, in particular Internet connection.

It is thus also possible to carry out more complex image recognition tasks for which the computation capacity of the hand-held device may not be sufficient. Of course, it is however also possible to carry out the image recognition in the hand-held device itself.

It is further preferred it, using the image recognition, at least one item of information relating to the security document is retrieved from a database and shown on the display.

This can for example be an item of information relating to the type of document or the issuing office, personalized information on the document holder or the like. This makes additional verification possible, as the user can thus check whether the database information is consistent with the information on the respective security document.

BRIEF DESCRIPTION OF THE DRAWINGS

The invention is now explained in more detail with reference to embodiment examples. There are shown in:

FIG. 10 A functional layer for a multilayer body with an antenna structure according to the state of the art;

FIG. 11 A detailed view of a security element for a functional layer of a multilayer body;

DETAILED DESCRIPTION OF THE PREFERRED EMBODIMENTS

Figure 1:
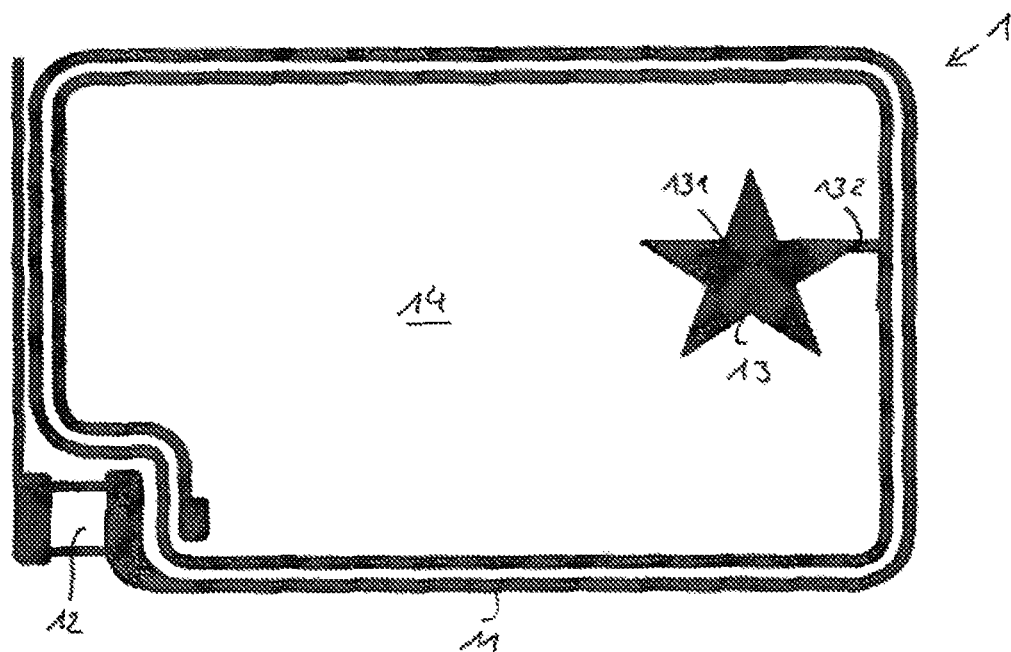
FIG. 1 An embodiment example of a functional layer with antenna structure and security element for an embodiment example of a multilayer body.

A functional layer 1 for a multilayer body, represented in top view in FIGS. 1 to 4 in various embodiment examples, serves to make possible wireless data transfer between the multilayer body and an external reader. In this way, for example security documents such as identity cards, passports, credit cards, product labels or the like can be provided with electronically retrievable data.

In order to make such communication possible, the functional layer 1 comprises an antenna structure 11 which is connected to an integrated circuit 12. The integrated circuit 12 comprises the active and passive components necessary for wireless communication, as well as storage elements in which the desired data can be stored.

In order to rule out manipulations or forgeries of the functional layer 1, a security element 13 is further provided. This has at least one conductive region 131 and is galvanically coupled to the antenna structure 11.

The security element 13 first offers an optical security function. Manipulations of the functional layer 1 can result in structural impairments of the security element 13, which can optionally already be recognized visually. A simple visual inspection of the security element 13 can therefore already increase protection against manipulation and forgery of the functional layer 1.

Furthermore, the galvanic connection between the conductive region 131 of the security element 13 and the antenna structure 11 influences the electrical properties of the antenna structure 11. In particular, the security element 13 has an influence on the inductance and capacitance of the antenna structure 11 and thus on the resonance frequency thereof.

If the conductive region 131 of the security element 13 is connected in series to the antenna structure 11, the resistance thereof, and thus the bandwidth and quality factor thereof are further changed.

If the functional layer 1 is manipulated or if during a forgery attempt the security element 13 is not accurately reproduced, the electrical properties of the antenna structure thus differ from the target values provided. This can be detected by the external reader, in order to recognize forgeries or manipulations. In the case of particularly marked deviations from the target values, communication with the external reader can also become quite impossible.

For the galvanic connection of the security element 13 to the antenna structure 11 there are two possibilities. A first possible embodiment is shown in FIG. 1. Here the conductive region 131 of the security element 13 is coupled with an individual track 132 to the antenna structure 11.

In this case, if the connection between security element 13 and antenna structure 11 is interrupted during a manipulation of the functional layer 1, the antenna structure 11 remains substantially intact. It is therefore desirable here, if the security element 13 exerts a clear influence on the electrical properties of the antenna structure 11.

In other words, the antenna structure 11, when taken alone, is preferably out of tune vis-à-vis the frequency used by the external reader for communication with the functional layer 1. Only by the galvanic connection to the security element 13 is the resonance frequency of the antenna structure 11 changed such that communication with the reader becomes possible.

A manipulation of the functional layer 1, during which the security element 13 or the connection thereof to the antenna structure via the track 132 is destroyed or changed, thus leads to a clear change in the resonance frequency of the antenna structure 11. A functional layer 1 manipulated in such a way can then either not be read, or exhibits such clearly changed properties that the manipulation can be recognized by the reader.

Preferably, the resonance frequency of the antenna structure 11 is changed by the connection to the security element 13 by at least 5% vis-à-vis the resonance frequency of the antenna structure 11 in the state not connected to the security element 13.

Figure 2:
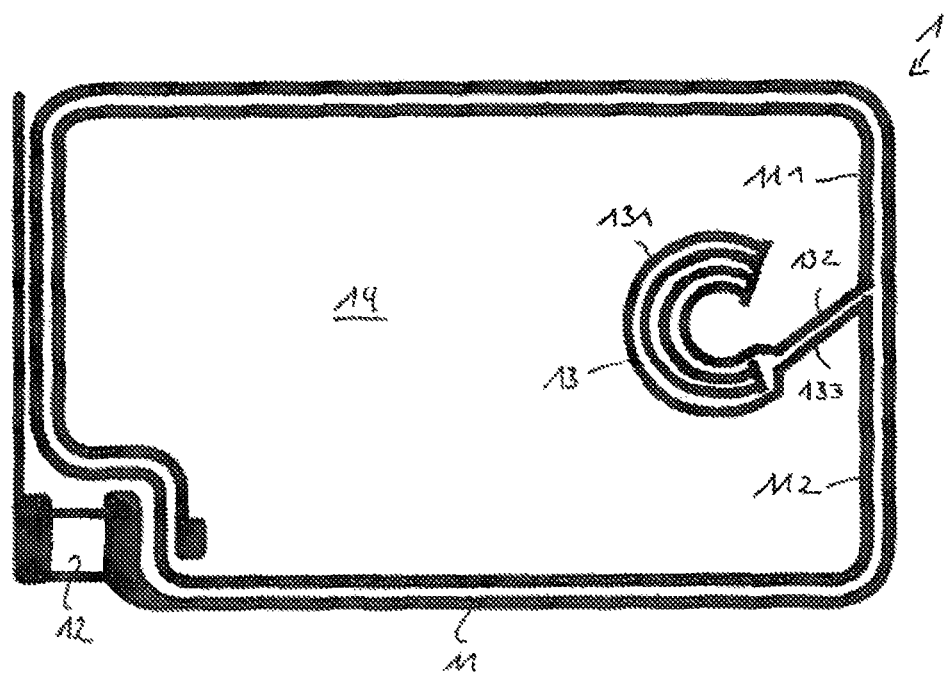
FIG. 2 An alternative embodiment example of a functional layer with antenna structure and security element for an embodiment example of a multilayer body.
Figure 3:
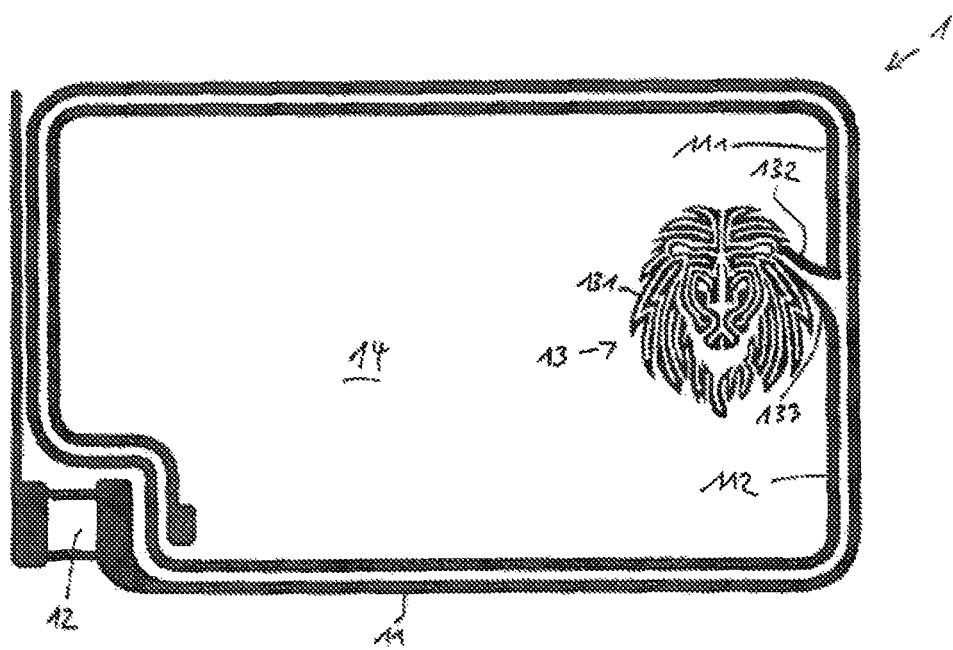
FIG. 3 An alternative embodiment example of a functional layer with antenna structure and security element for an embodiment example of a multilayer body.

An alternative embodiment is represented in FIG. 2 and FIG. 3. Here the conductive region 131 of the security element 13 is connected to the antenna element 11 via two tracks 132, 133. The antenna element 11 is separated into two partial regions 111, 112 which are not themselves connected. Only by the connection to the security element 13 are these partial regions 111, 112 galvanically coupled.

In this case, the connection of the two partial regions 111, 112 of the antenna element 11 is destroyed during a manipulation of the functional layer 1, whereby the electrical properties of the antenna element 11 are changed massively.

In this embodiment example, the antenna structure 11 by itself is preferably out of tune vis-à-vis the reading frequency of the reader. Only by the connection to the electrically conductive partial region 131 of the security element 13 are the properties of the antenna structure 11 changed such that wireless communication with the reader is made possible.

Preferably, the resonance frequency of the antenna structure 11 in the state connected to the circuit 12 and not connected to the electrically conductive partial region 131 of the security element 13 differs by from 5% to 20%, preferably by from 15% to 20% from a target resonance frequency, at which the antenna structure 11 can be wirelessly contacted by means of an allocated reader.

It is preferred if the electrically conductive partial region 131 of the security element 13 covers a maximum proportion of 20%, preferably from 10% to 15%, of the area 14 enclosed by an outermost winding of the antenna element 11.

Generally, the antenna structure 11 preferably has an inductance of from 1.0 µH to 6 µH, preferably from 1.5 µH to 4 µH, and a capacitance of from 1 pF to 55 pF, preferably from 5 pF to 30 pF.

By the series switching between the conductive partial region 131 and the antenna structure 11 in the embodiment described above, the electrical resistance of the antenna structure 11 and thus the bandwidth thereof are also changed. Preferably, the resistance of the conductive partial region 131 is from 0.2Ω to 3Ω, particularly preferably from 1Ω to 2Ω.

The electrically conductive partial region 131 further preferably has an inductance of from 0.05 µH to 1.0 µH, particularly preferably from 0.1 µH to 0.5 µH, and a capacitance of from 0.5 pF to 20 pF, preferably from 1 pF to 10 pF. It is further expedient if the electrically conductive partial region of the security element is formed as a track structure with a layer thickness of from 20 nm to 50 µm, preferably from 5 µm to 20 µm.

The electrically conductive partial region of the security element is preferably formed from a reflective material, in particular aluminum, copper, silver, gold, or metal alloy thereof.

Such materials combine a good electrical conductivity with an attractive optical appearance. The materials are suited to further processing and can for example be applied by metalization, sputtering, vacuum deposition or the like in the desired geometry with high resolution and accuracy.

It is further preferred if the security element 13 is formed multilayered, wherein the electrically conductive partial region 131 is overlaid by at least one further layer 134.

Such a multilayer construction can also be realized during the manufacture of the multilayer body. It is however also possible to provide the security element 13 separately, for example as a foil element which is then connected to the functional layer 1 of the multilayer body by laminating, hot stamping, gluing or the like, wherein the galvanic connection between the electrically conductive partial region 131 of the security element 13 and the antenna structure 11 of the multilayer body is produced. By means of such a multilayer construction, further security features can be integrated into the security element 13, further increasing protection against forgery and manipulation.

Figure 4:
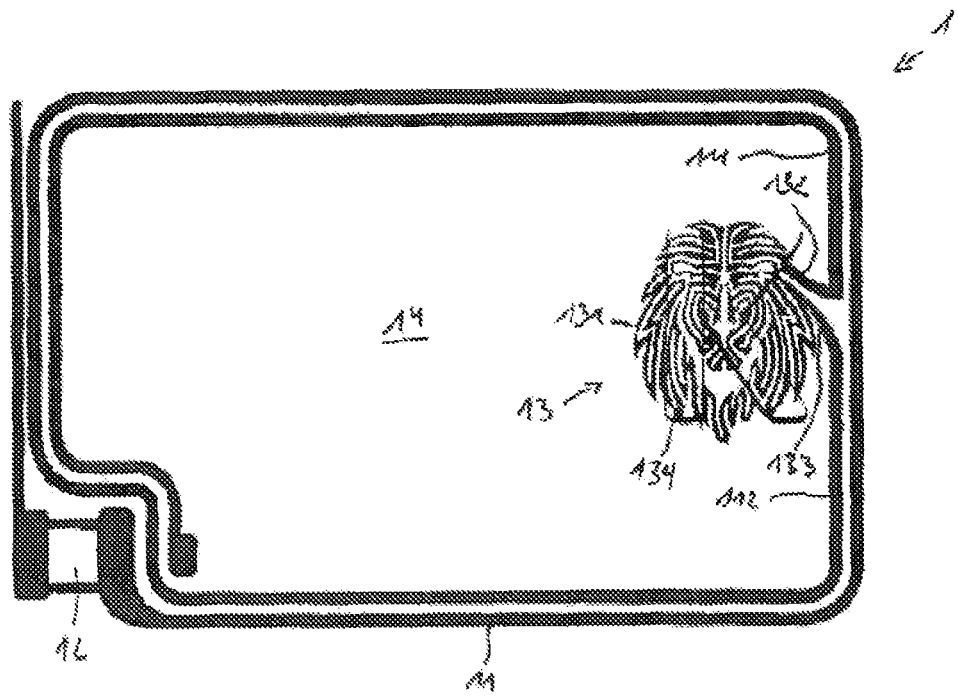
FIG. 4 An alternative embodiment example of a functional layer with antenna structure and security element with an additional optically variable structure for an embodiment example of a multilayer body.
Figure 5:
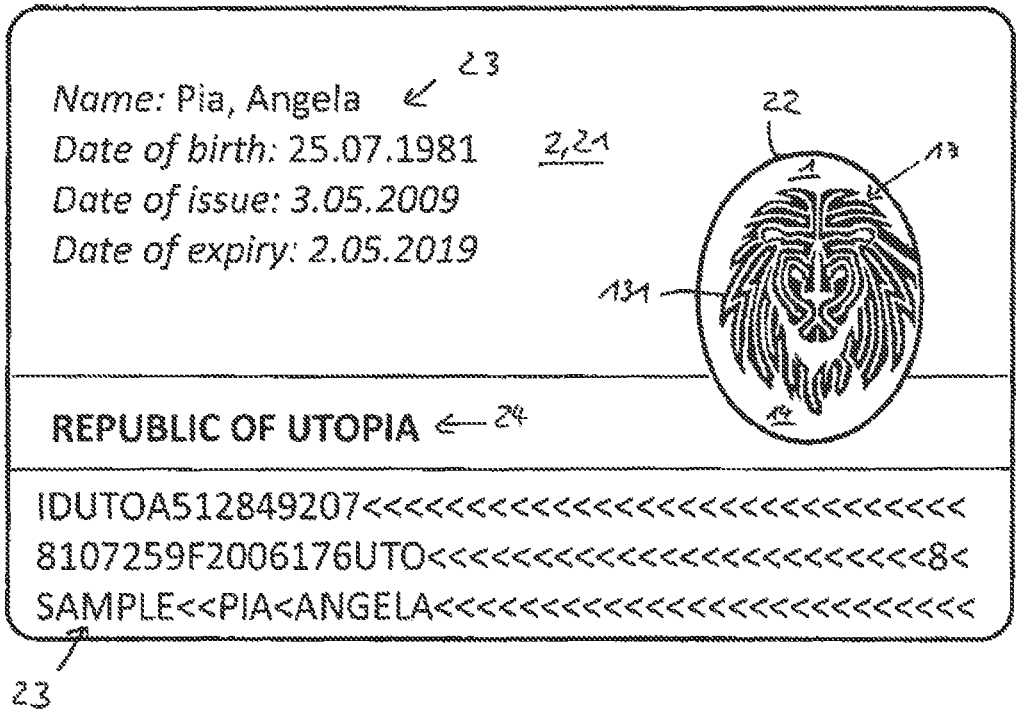
FIG. 5 An embodiment example of a multilayer body with a functional layer according to FIG. 3.
Figure 6:
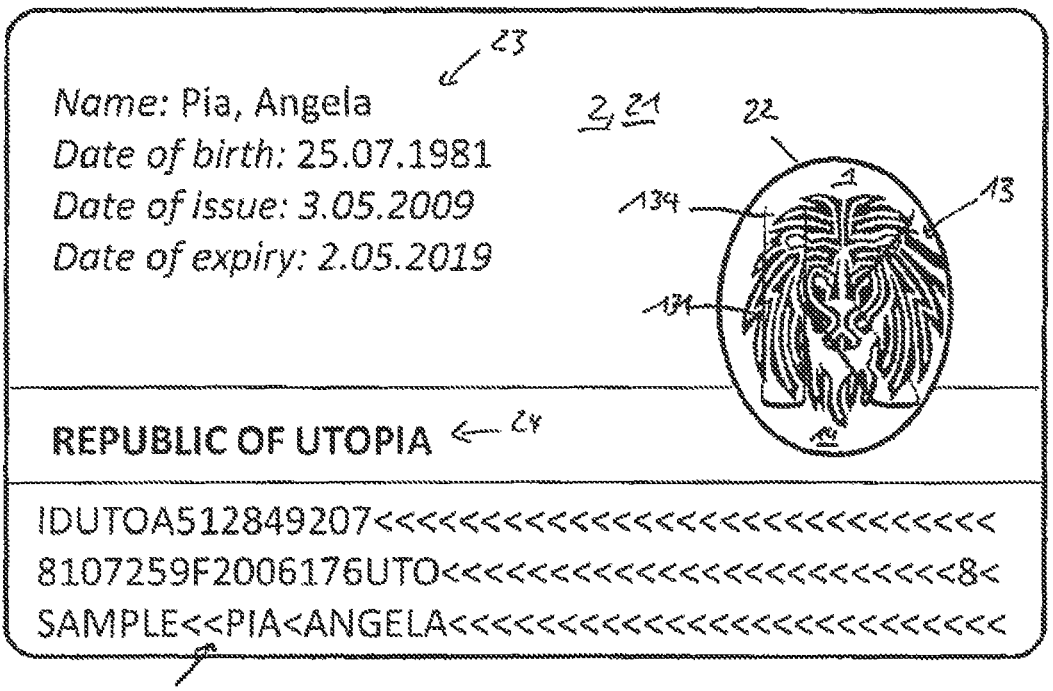
FIG. 6 An embodiment example of a multilayer body with a functional layer according to FIG. 4.
Figure 7:
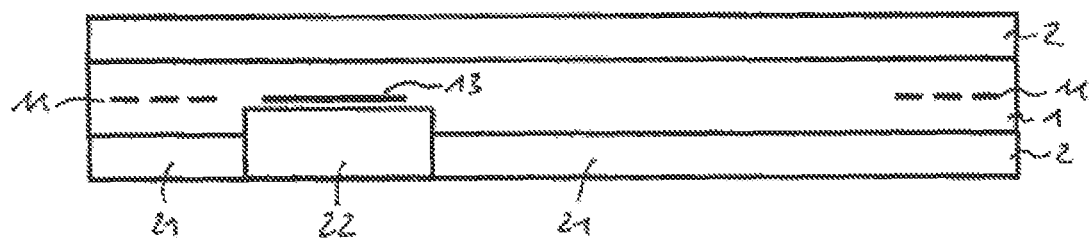
FIG. 7 A sectional representation through a multilayer body with a functional layer according to one of FIGS. 1 to 4 with a window overlapping the security element on one side.
Figure 8:
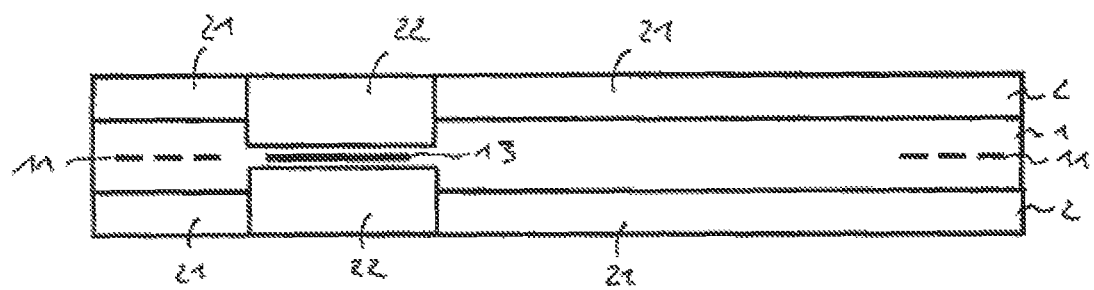
FIG. 8 A sectional representation through a multilayer body with a functional layer according to one of FIGS. 1 to 4 with windows overlapping the security element on both sides.

An example of this is represented in FIG. 4, wherein the security element 13 comprises an optically variable structure. Such structures on the one hand produce attractive optical effects which can be dependent on the illumination or viewing angle. On the other hand, optically variable structures are particularly difficult to imitate and therefore offer particularly good protection against forgery and manipulation.

The optically variable structure is formed by a surface relief of a replication layer 134 of the security element 13, as represented in FIG. 4. This is expedient if the security element 13 itself is constructed multilayered. Particularly good protection against manipulation and forgery is also guaranteed hereby, as for manipulations of the electrically conductive partial region 131, the further layers 134 of the security element 13 with the optically variable structure have to be removed first. This is however scarcely possible non-destructively, with the result that here too, manipulations are visually recognizable.

Here too, the security element 13 can optionally comprise further special partial detachment and adhesive layers which ensure that in the case of an attempt to detach the replication layer 134 from the electrically conductive partial region, this layer is destroyed.

The electrically conductive partial region 131 can serve as reflective layer for the optically variable structure. Alternatively or additionally, further metallic or HRI layers (HRI: high refractive index) can also still be integrated into the layer construction of the security element 13 as reflective layers for the optically variable structure. These further reflective layers can be present over the whole surface or only part thereof.

Furthermore, the surface relief can be molded into a replication layer of a separate multilayer body, for example into a hot or cold stamping film or a self-adhesive label and provided with a reflective layer. In a transfer step, the separate multilayer body with the optically variable structure is then applied, at least in a partial region, to the electrically conductive partial region 131 of the security element 13, for example by means of an adhesive layer and a corresponding transfer method.

Preferably, the surface relief forms an optically variable element, in particular a hologram, Kinegram® or Trustseal®, a preferably linear or crossed sinusoidal diffraction grating, a linear or crossed single- or multi-step rectangular grating, a zero-order diffraction structure, an asymmetrical relief structure, a blazed grating, a preferably isotropic or anisotropic mat structure, or a light-diffracting and/or light-refracting and/or light-focusing micro- or nanostructure, a binary or continuous Fresnel lens, a binary or continuous Fresnel freeform surface, a microprism structure or a combination structure thereof. By means of such structures, various optical effects can be realized, which are both optically attractive and difficult to imitate.

In the case of a single-layer security element 13, it is alternatively also possible that the optically variable structure is formed by a surface relief of the electrically conductive partial region 131. In this embodiment, the relief structures which produce the optically variable effect are thus introduced directly into the electrically conductive partial region 131. This can, for example, be carried out by stamping into a metal layer which forms this partial region. Any manipulation of the electrically conductive partial region 131 in this case directly destroys the surface relief, with the result that the optically variable effect is lost or visually recognizably changed. Manipulations or forgeries can therefore already be recognized with the naked eye.

Alternatively or additionally to the surface relief, the optically variable structure can be formed by a single- or multilayer volume hologram and/or by a thin-layer film system producing a color change effect in the case of a change in the illumination and/or viewing angle, in particular a Fabry-Pérot thin-layer film system.

It is further advantageous if the security element 13 comprises at least one partial varnish layer which forms an item of optical information. An additional security feature can also be provided hereby, which would be damaged during manipulations of the conductive partial region. The item of optical information can stand alone or also form an overall design in combination with a design formed by the conductive partial region and/or an optionally present optically variable structure.

It is expedient if the at least one partial varnish layer comprises colorants, in particular colored or achromatic pigments and/or dyes, and/or effect pigments, thin-layer film systems, cholesteric liquid crystals, and/or metallic or non-metallic nanoparticles.

Complex visual designs can hereby be realized, which also increase protection against forgery.

It is expedient if the colorants can be at least partially excited to fluorescence and/or phosphorescence in the ultraviolet and/or infrared spectrum, in particular in the visible spectrum. Thus further security features can be integrated into the security element 13, which only become visible under suitable illumination conditions and can then be verified visually or by machine.

It is preferred if the item of optical Information is in the form of at least one motif, pattern, in particular a guilloche pattern, symbol, image, logo, coding or alphanumeric characters, in particular a microtext.

It is further expedient if the functional layer 1 of the multilayer body is provided with a covering layer 2 on one or both sides. This is illustrated in various embodiments in FIGS. 5 to 9.

The covering layer 2 has a non-transparent partial region 21 and a transparent partial region 22.

By "a transparent partial region" is meant a partial region with a transmissivity of from 50% to 100% in the spectral range visible to the human eye.

A non-transparent partial region on the other hand has a transmissivity of less than 10%, preferably of less than 5% in the spectral range visible to the human eye.

In other words, the covering layer 2 comprises at least one transparent window. Such a covering layer 2 which is transparent in a partial region, but otherwise opaque or non-transparent, can be used to conceal partial regions of the functional layer 1 which are not intended to be visible as they would for example interfere with the overall design, while partial regions of the functional layer 1 which contribute to the design are visible through the window.

It is also possible to provide several covering layers 2 which are arranged on both sides of the functional layer 1, with the result that design elements of the functional layer 1 are visible from both sides of the multilayer body. This is illustrated in the cross-sectional representation in FIG. 8.

Preferably, the covering layer 2 consists of one or more polymers, for example PVC, ABS, PET, PET-G, BOPP, polypropylene, polyamide or polycarbonate, Teslin® or synthetic paper and has a layer thickness of from 10 µm to 400 µm, preferably from 50 µm to 100 µm.

It is preferred if the at least one non-transparent partial region 21 at least partially overlaps the antenna structure 11 viewed in the direction of the surface normals onto the plane spanned by the multilayer body.

Thus optically unattractive partial regions of the functional layer 1, in particular the antenna structure 11 or also the integrated circuit 12, can be concealed, with the result that they do not interfere with the overall design of the multilayer body.

The transparent partial region 22 on the other hand preferably overlaps the security element 13 viewed in the direction of the surface normals onto the plane spanned by the multilayer body, with the result that the design elements thereof are at least partially visible from one or both sides of the multilayer body.

In the covering layer 2, moreover, further informative elements or design elements can be provided, such as for example personalization information 23 or other graphic or alphanumeric elements 24.

Figure 9:
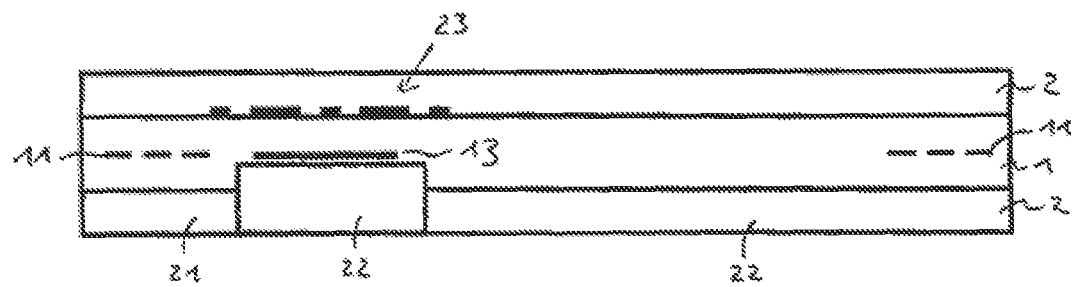
FIG. 9 A sectional representation through a multilayer body with a functional layer according to one of FIGS. 1 to 4 with a window overlapping the security element on one side and an overlapping between the security element and a personalization feature.

As FIG. 9 shows, it is possible that the security element 13 and the transparent partial region 22 of the covering layer overlaps such an item of personalization Information 23. The security element 13 thus receives an additional function, namely the protection of the personalization information 23 against manipulations which, in the case of such an embodiment, are not possible without damaging the security element 13.

The influence of the electrically conductive partial region 131 on the properties of the antenna structure 11 is explained in more detail below. For this, in FIG. 10 first of all a functional layer 1 according to the state of the art with an antenna structure 11 without a security element 13 is represented. FIGS. 11 to 14 show detailed views of differently designed security elements 13 which can be connected to such an antenna structure 11.

The following table summarizes the electrical properties of the embodiments represented in FIGS. 10 to 14.

Figure 12:
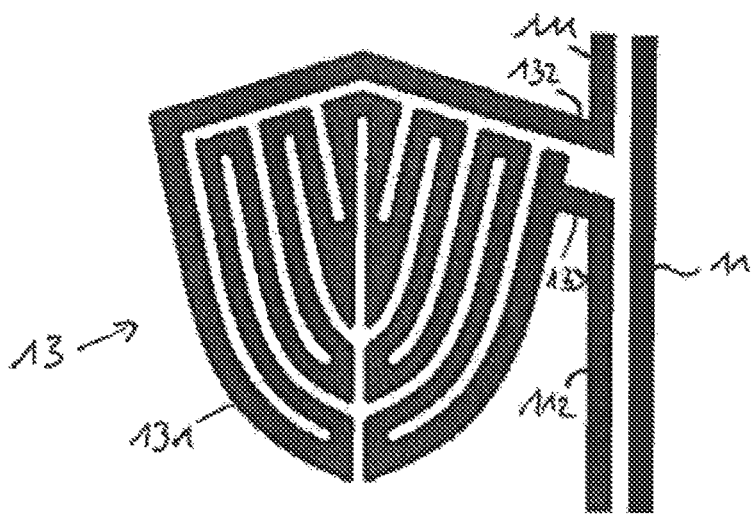
FIG. 12 A detailed view of an alternative security element for a functional layer of a multilayer body.
Figure 13:
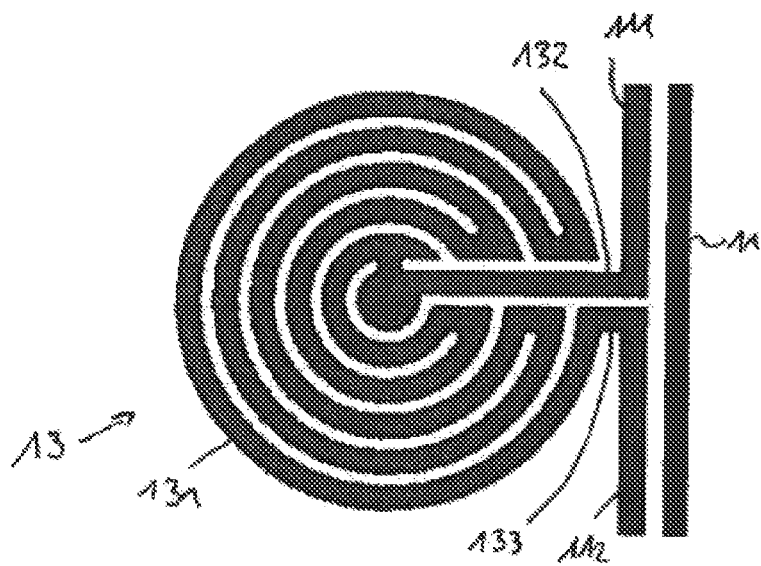
FIG. 13 A detailed view of an alternative security element for a functional layer of a multilayer body.
Figure 14:
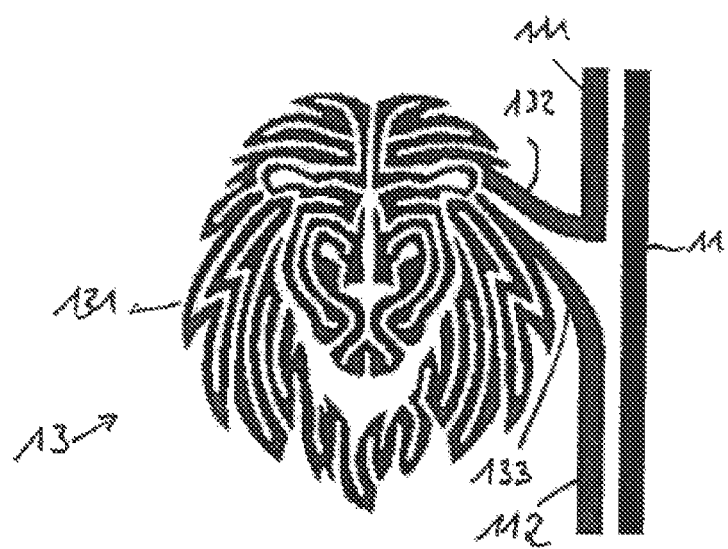
FIG. 14 A detailed view of an alternative security element for a functional layer of a multilayer body.

| Embodiment | f (antenna) [MHz] | f (antenna + circuit) [MHz] | L [µH] | C [pF] | R [Ω] |
|---|---|---|---|---|---|
| FIG. 10 | 19.4 | 16.1 | 1.3 | 50.9 | 0.61 |
| FIG. 11 | 19.5 | 16.2 | 1.3 | 51.2 | 0.69 |
| FIG. 12 | 19.4 | 16.1 | 1.3 | 50.9 | 0.76 |
| FIG. 13 | 19.3 | 16.1 | 1.3 | 52.6 | 0.92 |
| FIG. 14 | 19.2 | 15.9 | 1.4 | 50.2 | 1.92 |

It can be seen that the resonance frequency f of the antenna structure 11, neither by itself nor in conjunction with the integrated circuit 12, is substantially influenced by the security elements 13 in the embodiment examples shown.

The inductance L, and the capacitance C of the antenna structure 11 are also substantially insensitive vis-à-vis the connection to the security element 13. Changes in the resistance R, on the other hand, only slightly affect the resonance frequencies. In such cases, an antenna structure 11 can thus be used, which substantially corresponds to the state of the art shown in FIG. 10.

It is however also possible to design a security element 13 such that the electrical properties of the antenna structure 11 are clearly influenced. In this case, as already explained at the start, the antenna structure 11 must be designed such that in the absence of the security element it is out of tune vis-à-vis a reading frequency of the external reader.

Figure 15:
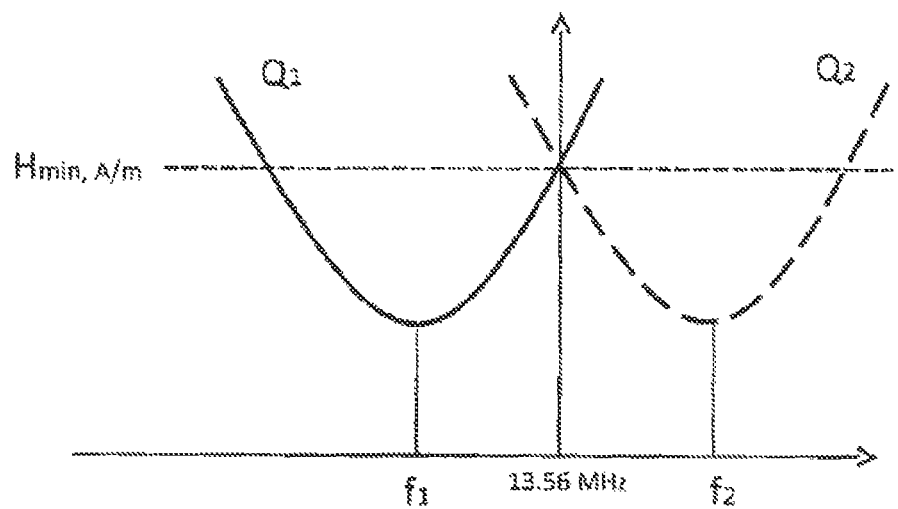
FIG. 15 A graph showing the frequency dependence of the field strength for an antenna which is out of tune vis-à-vis a reader.

The frequency dependence of the field strength of such an antenna structure 11 is represented in FIG. 15 for two examples. As can be seen, the resonance frequency $f_1$ of a first antenna structure with the quality factor $Q_1$ lies below the resonance frequency of the reader of 13.56 MHz. The resonance frequency $f_2$ of a second antenna structure with the quality factor $Q_2$ on the other hand lies above the resonance frequency of the reader of 13.56 MHz.

By the "quality factor" of an antenna is meant the quotient of resonance frequency and bandwidth.

In both cases the field strength of the respective antennae lies at the resonance frequency of the reader below the minimum necessary field strength H, with the result that communication with the reader is not possible.

It is preferred if the resonance frequency $f_t$ is less than 12.5 MHz and the quality factor $Q_1$ is greater than 10, as well as if the resonance frequency $f_2$ is greater than 17.5 MHz and the quality factor $Q_2$ is greater than 20.

In both cases, only the connection of the antenna structure 11 to the electrically conductive partial region 131 of the security element 13 makes communication with the reader possible.

Figure 16:
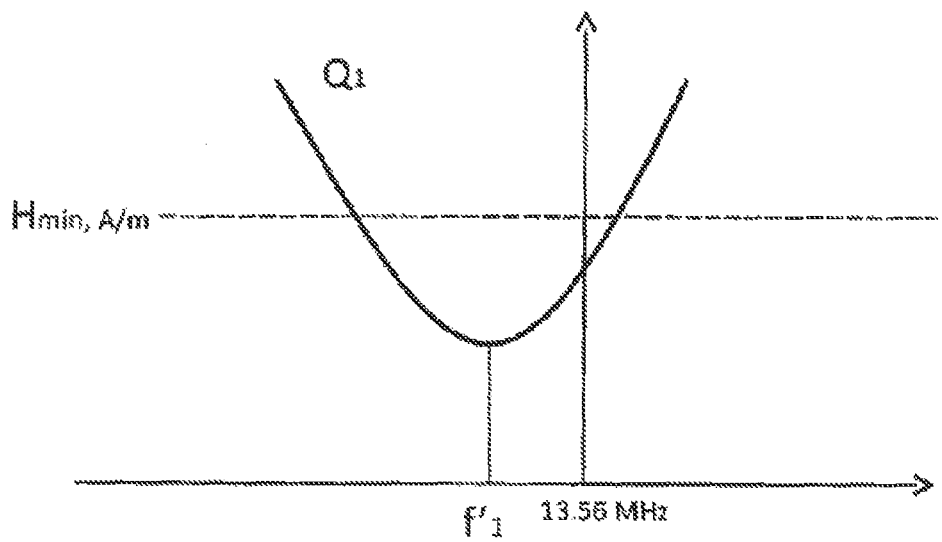
FIG. 16 A graph showing the frequency dependence of the field strength for an antenna which is out of tune vis-à-vis a reader and achieves the necessary field strength at the reading frequency in conjunction with an embodiment example of a security element.
Figure 17:
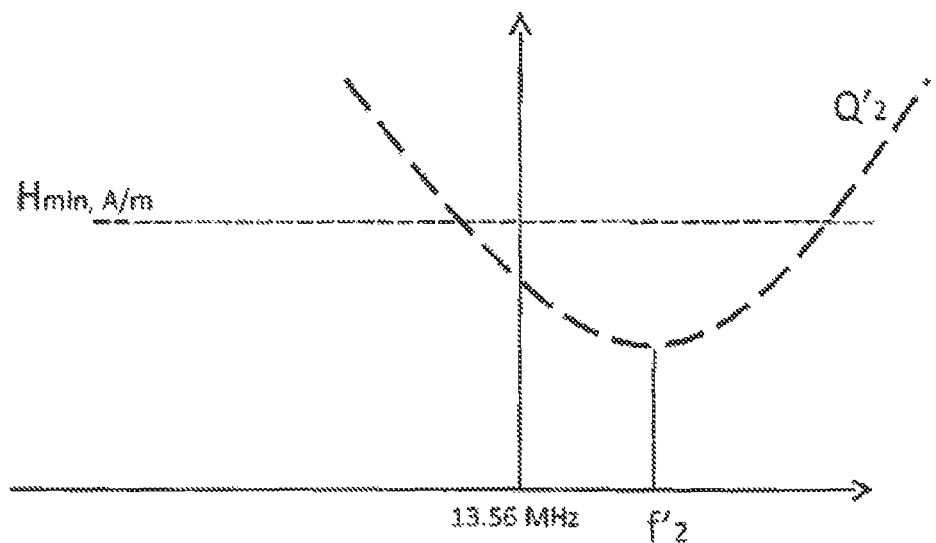
FIG. 17 A graph showing the frequency dependence of the field strength for an antenna which is out of tune vis-à-vis a reader and achieves the necessary field strength at the reading frequency in conjunction with an alternative embodiment example of a security element.

There are several possibilities for this. As shown in FIG. 16, by the connection of an antenna structure 11 with a quality factor $Q_1$ greater than 10 to the security element, the resonance frequency of the antenna structure $f'_1$ can be moved to a value greater than 12.5 MHz, with the result that the field strength at the reading frequency of 13.56 MHz exceeds the minimum value $H_{min}$.

It is expedient if the security element 13 occupies a proportion of more than 20% of the area enclosed by the antenna structure 11. The inductance of the antenna structure 11 is reduced and the resonance frequency increased by the shielding effect of the additional metalized area. No interruption of the antenna structure 11 is necessary here. A possible embodiment example of this is the variant shown in FIG. 1.

Alternatively, it is possible to interrupt an antenna structure with a quality factor $Q_2$ of more than 20 and to connect the partial regions 111, 112 to the conductive partial region 131 of a security element 13 according to FIG. 3.

The electrical resistance of the antenna structure 11 is considerably increased by the fine and elongated track structure of the conductive partial region 131, with the result that the antenna structure 11 connected to the security element 13 has a changed quality factor $Q'_2$. The area of the security element 13 here covers less than 20% of the area enclosed by the antenna structure 11, with the result that the capacitance and inductance of the antenna structure 11 scarcely change. The resulting resonance frequency $f'_2$ also scarcely changes.

Here too, the minimum necessary field strength at the reading frequency is again achieved.

Figure 18:
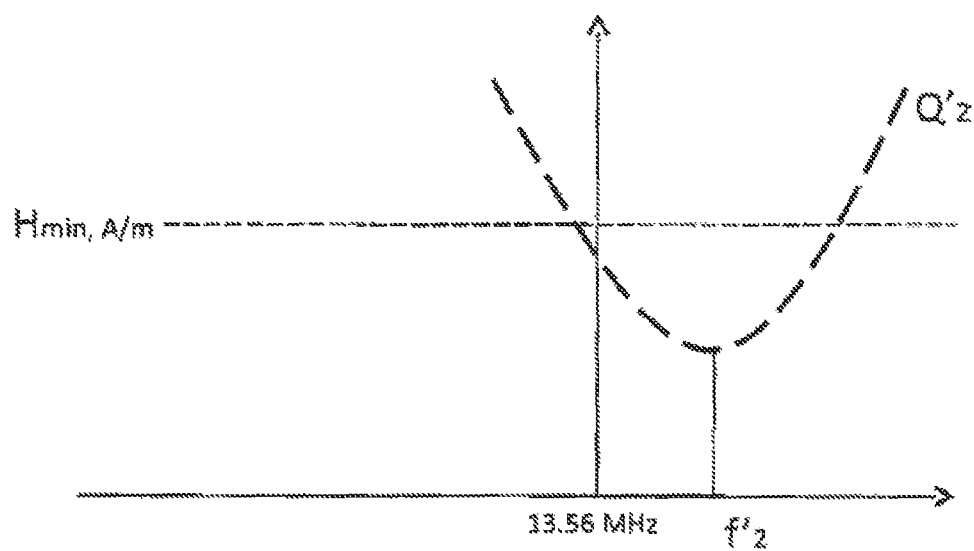
FIG. 18 A graph showing the frequency dependence of the field strength for an antenna which is out of tune vis-à-vis a reader and achieves the necessary field strength at the reading frequency in conjunction with a further alternative embodiment example of a security element.

In a third variant, the partial regions 111, 112 of an interrupted antenna structure 11 are bypassed by the conductive partial region 131 of a security element 13 with low electrical resistance. This is represented in FIG. 18. The security element 13 has relatively short and wide track structures, as shown in FIG. 2.

As the resistance of the antenna structure 11 scarcely changes here, the quality factor $Q'_2$ also remains substantially unchanged. The security element 13 however changes the antenna capacitance, with the result that the resulting resonance frequency $f'_2$ is moved towards the reading frequency of the reader. Here too, communication with the reader is thus again possible.

A further possibility for authenticating a security document which comprises a security element 13 of the type described consists in reading the electrical properties of the conductive partial region 131 itself.

Figure 19:
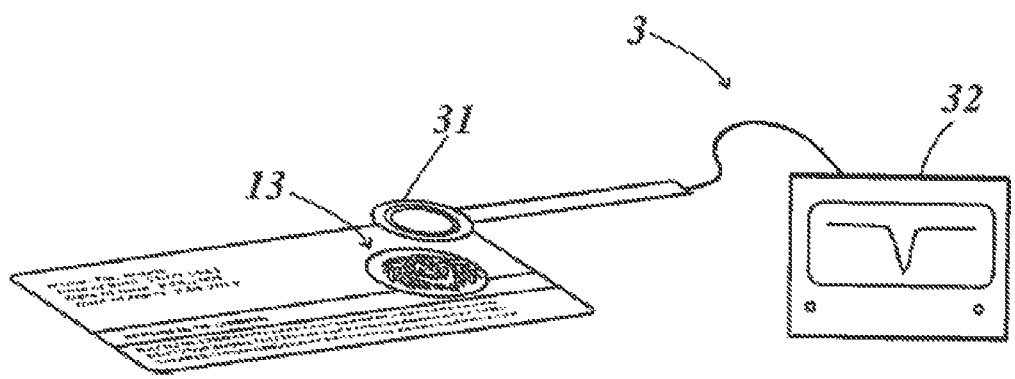
FIG. 19 A schematic representation of an arrangement for analyzing the electrical properties of an embodiment example of a security element.

For this, as shown in FIG. 19, an antenna coil 31 of a reading device 3 is brought to cover the security element 13. The diameter of the antenna coil 31 substantially corresponds to the diameter of the security element 13, with the result that the properties thereof can be recorded independently of the antenna structure 11.

By means of a display and evaluation unit 32, it can then be determined whether the electrical properties of the security element 13 correspond to the target values and whether the security element 13 is thus authentic or has been manipulated or forged.

Figure 20:
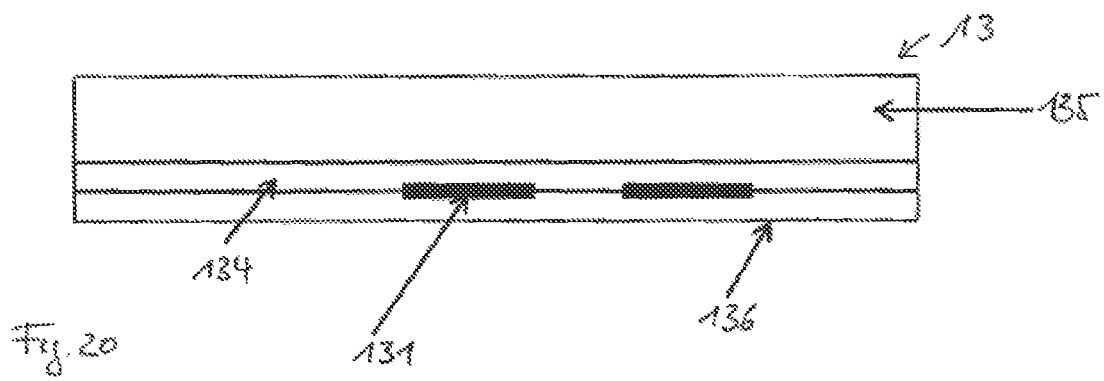
FIG. 20 A schematic representation of a transfer film for producing a multilayer body.

As FIG. 20 shows, the security element 13 can first be provided as a transfer film. A replication layer 134 is provided on a carrier ply 135 and, by metalization and optionally subsequent structuring (e.g. by etching, by means of photoresist, by means of a washing process) provided with a partial metal layer which forms the conductive partial region 131. Finally an adhesive layer 136 is applied, with which the transfer ply of the transfer film can be attached to the substrate.

Figure 21:
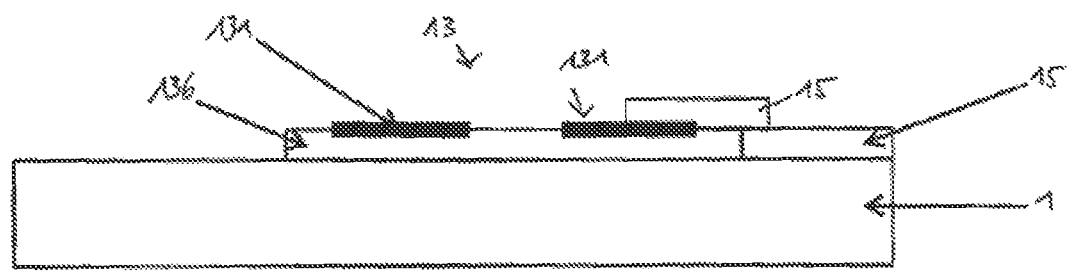
FIG. 21 A schematic representation of a multilayer body after transfer of a security element from a transfer film according to FIG. 20.

After the transfer of the transfer ply onto the functional layer 1 of the substrate, the structure according to FIG. 21 results. In the embodiment shown, the replication layer 134 remains on the carrier ply 135, such that the conductive partial regions lie on the surface. Alternatively, the replication layer 134 is also transferred, but removed again in a further step. The contacting of the electrically conductive partial region 131 of the security element 13 takes place through a printed-on conductive varnish, which connects the partial region 131 to the antenna element 11 not shown here. The substrate preferably consists of polycarbonate with a layer thickness of 50 µm, the adhesive layer has a preferred layer thickness of 4 µm, the track structure of the security element a preferred layer thickness of 100 nm. In a subsequent step, the antenna element 11 and the electrically conductive partial region 131 are galvanically reinforced together.

Figure 22:
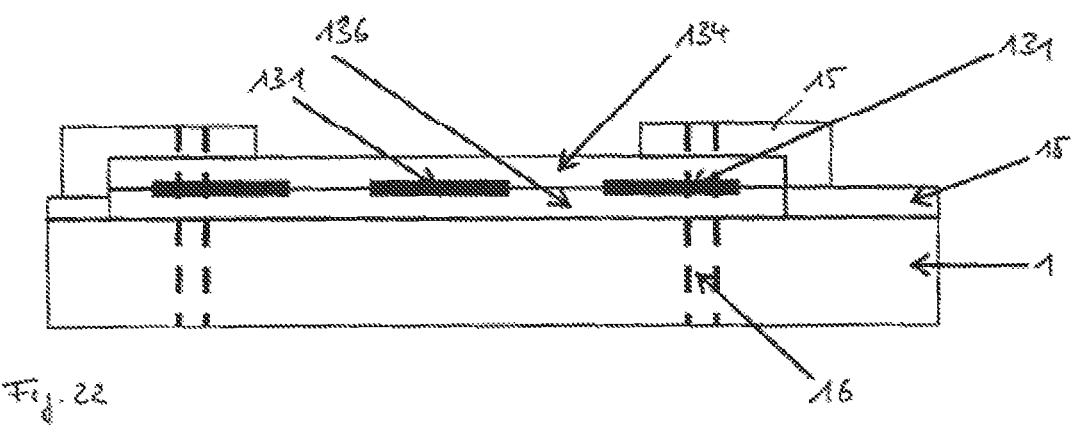
FIG. 22 A schematic representation of a multilayer body with stamped contacting after transfer of a security element from a transfer film according to FIG. 20.

An alternative embodiment is shown in FIG. 22. After the transfer of the transfer ply with the replication layer 134, the printing of the antenna tracks takes place by means of conductive varnish 15. An electrical connection to the partial region 131 does not exist for the time being. Before the galvanizing of the antenna 11, holes 16 are punched, analogously to those for a through-connection on the back. Not only are the conductive varnish 15 and the substrate pierced, but also the thin replication layer 134 on the contact points. During subsequent galvanizing of the antennae 11 onto the conductive varnish 15, the piercing points 16 are also reinforced and a good electrical and mechanical connection between the conductive partial region 131 and the antenna tracks 11 is ensured. As the replication varnish layer 134 prevents the galvanic reinforcement of the underlying electrically conductive partial regions 131, it is advantageous to design these partial regions 131 sufficiently thick before the transfer of the transfer ply. The preferred layer thickness of the electrically conductive partial regions 131 is preferably more than 500 nm, further preferably more than 1000 nm. Such thicknesses can be achieved by vapor deposition or also advantageously by galvanic reinforcement of a previously structured thin conductive, for example vapor-deposited or printed conductive layer.

Figure 23:
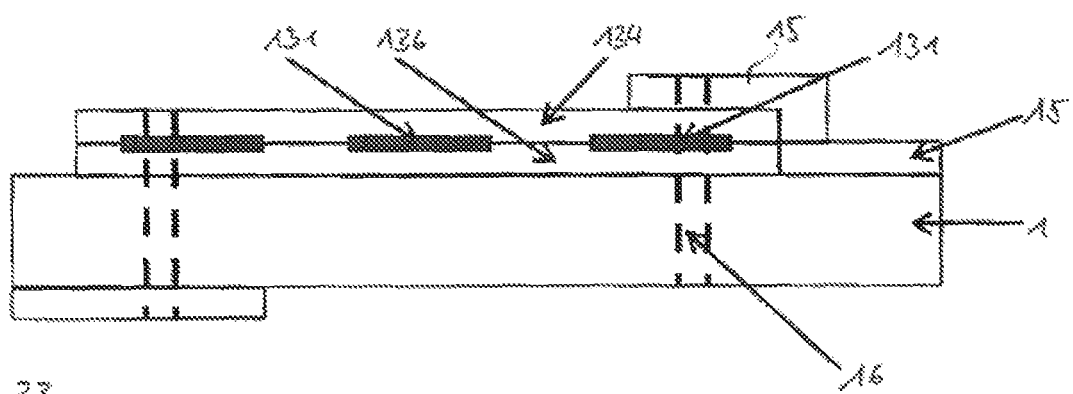
FIG. 23 A schematic representation of a multilayer body with stamped reverse contacting after transfer of a security element from a transfer film according to FIG. 20.

The production of the embodiment according to FIG. 23 corresponds to this procedure. However, on the side of the functional layer 1 facing away from the security element 13, conductive varnish 15 is also provided there, which is also connected to the conductive partial region 131 through the perforations 16.

Figure 24:
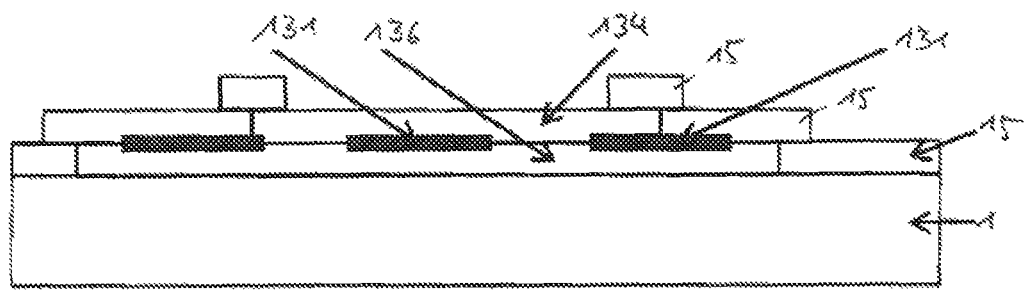
FIG. 24 A schematic representation of a multilayer body with partially removed replication layer after transfer of a security element from a transfer film according to FIG. 20.

Alternatively to this, as shown in FIG. 24, the isolating replication layer 134 can also be removed in regions over the electrically conductive partial region 131, in order thus to make possible a direct contact between the electrically conductive partial region 131 and the conductive varnish 15 which forms the antenna structure 11 after the galvanization. Perforations can then be dispensed with.

The antenna element 11 and security element 13 can also be manufactured completely separately and mechanically connected, for example by soldering, crimping, ultrasonic welding or gluing with a conductive adhesive. The assembly on the substrate 1 advantageously takes place by means of transfer of the separately manufactured elements. A wire antenna can also be used as antenna element 11. The security element 13 is for example applied to the substrate in a first step and the wire antenna is then applied. However, this procedure can also be carried out in reverse order.

LIST OF REFERENCE NUMBERS 1 functional layer
11 antenna structure
111 partial region
112 partial region
12 integrated circuit
13 security element
131 electrically conductive partial region
132 track
133 track
134 further layer, replication layer
135 carrier ply
136 adhesive layer
14 enclosed area
2 covering layer
21 non-transparent region
22 transparent region
23 personalization information
24 further information
3 reading device
31 antenna coil
32 evaluation and display unit

The invention claimed is:

1. A multilayer body with a functional layer which comprises an antenna element as well as with an optical security element which comprises at least one electrically conductive partial region which is galvanically connected to the antenna element, wherein the security element further comprises an optically variable structure, the optically variable structure comprising a surface relief producing an optical effect dependent on illumination or viewing angle, and
  wherein the antenna element comprises at least one winding, the at least one winding comprising an outermost winding enclosing an area, and wherein the electrically conductive partial region of the security element covers a maximum proportion of 20% of the area enclosed by the outermost winding of the antenna element, and wherein the surface relief is formed in the electrically conductive partial region or in a replication layer of the security element.

2. The multilayer body according to claim 1, wherein the electrically conductive partial region of the security element galvanically connects a first partial region of the antenna element to a second partial region of the antenna element.

3. The multilayer body according to claim 1, wherein the outermost winding is arranged with a predominant proportion of the area in a frame-shaped region of the multilayer body with the external dimensions 81 mm×49 mm and the internal dimensions 64 mm×34 mm.

4. The multilayer body according to claim 1, wherein the security element is arranged entirely within the area enclosed by the outermost winding.

5. The multilayer body according to claim 1, wherein the electrically conductive partial region of the security element is formed as a track structure with a width of more than 100 μm.

6. The multilayer body according to claim 1, wherein the electrically conductive partial region of the security element is formed as a track structure with a layer thickness of from 20 nm to 50 μm.

7. The multilayer body according to claim 1, wherein the electrically conductive partial region of the security element is formed from a reflective material, comprising aluminum, copper, silver, gold, or a metal alloy thereof.

8. The multilayer body according to claim 1, wherein the antenna structure is galvanically connected to an integrated circuit.

9. The multilayer body according to claim 8, wherein the antenna structure in the state connected to the circuit has a resonance frequency of from 14.5 MHz to 17.5 MHz.

10. The multilayer body according to claim 8 wherein the resonance frequency of the antenna structure in the state connected to the circuit and the electrically conductive partial region of the security element differs by not more than 5% from a resonance frequency of an otherwise geometrically identical antenna structure, which is not connected to the electrically conductive partial region of the security element.

11. The multilayer body according to claim 8 wherein the resonance frequency of the antenna structure in the state connected to the circuit and not connected to the electrically conductive partial region of the security element differs by from 5% to 20% from a target resonance frequency, at which the antenna structure can be wirelessly contacted by means of an allocated reader.

12. The multilayer body according to claim 1 wherein the antenna structure has an inductance of from 1.0 μH to 6 μH.

13. The multilayer body according to claim 1 wherein the antenna structure has a capacitance of from 1 pF to 55 pF.

14. The multilayer body according to claim 1 wherein the antenna structure has an electrical resistance of from 0.5Ω to 6Ω.

15. The multilayer body according to claim 1 wherein the security element has an electrical resistance of from 0.2Ω to 3Ω.

16. The multilayer body according to claim 1 wherein the security element has an inductance of from 0.05 μH to 1.0 μH.

17. The multilayer body according to claim 1 wherein the security element has a capacitance of from 0.5 pF to 20 pF.

18. The multilayer body according claim 1 wherein the security element comprises an induction structure which is inductively coupled to a further induction structure of the functional layer.

19. The multilayer body according to claim 1 wherein the security element forms a design that is visible to the human eye and/or machine-readable, image, motif, logo, one or more alphanumeric characters.

20. The multilayer body according to claim 1 wherein the security element is formed multilayered, wherein the electrically conductive partial region is formed by a functional layer of the security element.

21. The multilayer body according to claim 1, wherein the surface relief is formed in the electrically conductive partial region.

22. The multilayer body according to claim 1, wherein the surface relief is formed in a replication layer of the security element, and wherein the surface relief in the replication layer overlaps the electrically conductive partial region.

23. The multilayer body according to claim 1, wherein the surface relief forms an optically variable element, a linear or crossed sinusoidal diffraction grating, a linear or crossed single- or multi-step rectangular grating, a zero-order diffraction structure, an asymmetrical relief structure, a blazed grating, an isotropic or anisotropic mat structure, or a light-diffracting and/or light-refracting and/or light-focusing micro- or nanostructure, a binary or continuous Fresnel lens, a binary or continuous Fresnel freeform surface, a microprism structure or a combination structure thereof.

24. The multilayer body according to claim 20 wherein the security element comprises at least one partial varnish layer which forms an item of optical information.

25. The multilayer body according to claim 24, wherein the at least one partial varnish layer comprises colored or achromatic pigments and/or effect pigments, thin-layer film systems, cholesteric liquid crystals, dyes and/or metallic or non-metallic nanoparticles.

26. The multilayer body according to claim 25, wherein the colorants can be at least partially excited to fluorescence and/or phosphorescence in the ultraviolet and/or infrared spectrum in the visible spectrum.

27. The multilayer body according to claim 24 wherein the item of optical information is in the form of at least one motif, guilloche pattern, symbol, image, logo or microtext.

28. The multilayer body according to claim 1 wherein the security element overlaps a further graphic element of the multilayer body at least in regions.

29. The multilayer body according to claim 1 wherein the multilayer body comprises a covering layer which has at least one transparent partial region and at least one non-transparent partial region.

30. The multilayer body according to claim 29, wherein the at least one transparent partial region overlaps the security element viewed in the direction of the surface normals onto the plane spanned by the multilayer body.

31. The multilayer body according to claim 29 wherein the at least one non-transparent partial region at least partially overlaps the antenna structure viewed in the direction of the surface normals onto the plane spanned by the multilayer body.

32. A multilayer body with a functional layer which comprises an antenna element as well as with an optical security element, the optical security element comprising:
at least one electrically conductive partial region which is galvanically connected to the antenna element; and an optically variable structure, the optically variable structure comprising a surface relief producing an optical effect dependent on illumination or viewing angle, wherein the multilayer body comprises a covering layer which has at least one transparent partial region and at least one non-transparent partial region, and wherein the at least one non-transparent partial region at least partially overlaps the antenna structure viewed in the direction of the surface normals onto the plane spanned by the multilayer body, and wherein the antenna element comprises at least one winding, the at least one winding comprising an outermost winding enclosing an area, and wherein the electrically conductive partial region of the security element covers a maximum proportion of 20% of the area enclosed by the outermost winding of the antenna element, and wherein the surface relief is formed in the electrically conductive partial region or in a replication layer of the security element.

* * * * *